United States Patent [19]
Mortenson

[11] Patent Number: 5,393,081
[45] Date of Patent: Feb. 28, 1995

[54] HAND TRUCK ASSEMBLIES AND METHODS OF CONSTRUCTING AND OPERATING THEM

[75] Inventor: Carl N. Mortenson, Midland, Mich.

[73] Assignee: Magline, Inc., Pinconning, Mich.

[21] Appl. No.: 217,294

[22] Filed: Mar. 23, 1994

Related U.S. Application Data

[63] Continuation of Ser. No. 955,509, Oct. 2, 1992, abandoned.

[51] Int. Cl.⁶ .............................................. B62B 1/04
[52] U.S. Cl. .................................... 280/47.27; 188/22
[58] Field of Search ........................... 188/22, 23, 2 D; 280/47.27, 5.26

[56] References Cited

U.S. PATENT DOCUMENTS

| | | | |
|---|---|---|---|
| 2,733,074 | 1/1956 | Fuglie et al. | 188/22 |
| 2,823,921 | 2/1958 | Lagaard | 188/22 |
| 3,968,974 | 7/1976 | Wetzel | 280/47.27 |
| 3,997,182 | 12/1976 | Mortenson | 280/47.27 |
| 4,142,732 | 3/1979 | Boyd | 188/22 |
| 4,563,014 | 1/1986 | Mortenson | 280/47.18 |
| 4,790,547 | 12/1988 | Mortenson | 280/47.27 |
| 4,823,915 | 4/1989 | Nagano | 188/2 D |
| 5,029,884 | 7/1991 | Maendel | 280/47.27 |

OTHER PUBLICATIONS

Yankee bicycle pamphlet, 1125 California Drive West Chicago, Ill., 60185, 1991.

Primary Examiner—Robert J. Oberleitner
Assistant Examiner—Chris Schwartz
Attorney, Agent, or Firm—Learman & McCulloch

[57] ABSTRACT

A hand truck has a pair of horizontally spaced, vertically extending side rails connected laterally to form a hand truck frame which has a handle incorporated with the upper portion thereof. Unique axle supporting brackets fixed to the inner sides of the lower end of each side rail extend rearwardly to an axle and wheel mechanism for supporting the frame which has a nose plate. A brake disc rim is secured to each wheel and a brake actuator is mounted on the frame near the hand truck handle to operate normally slacked flexible cables which are trained around the discs and guided by a bracket secured mechanism.

12 Claims, 5 Drawing Sheets

HAND TRUCK ASSEMBLIES AND METHODS OF CONSTRUCTING AND OPERATING THEM

This is a continuation of application Ser. No. 07/955,509, filed on Oct. 2, 1992, abandoned.

BACKGROUND OF THE INVENTION

This invention relates to hand trucks of improved construction, and more particularly to what may be termed narrow aisle hand trucks of reduced width which are readily maneuverable in congested aisles and passageways in stores, warehouses and the like, for example. Hand trucks of the general character described, incorporating a pair of horizontally spaced, vertically upstanding side rails connected by laterally extending braces to form a hand truck frame, axle supporting brackets for supporting the axle and pair of wheels which support the frame, and the nose plate structure which is fixed at the lower end of the hand truck frame to provide a forwardly extending load support platform have previously been provided with brackets which have been welded to the laterally inner sides of the hand truck rails. Other hand trucks have incorporated rather bulky brakes, but, to my knowledge, no one has developed a brakeable narrow aisle hand truck, wherein the brake system is so constructed that it does not increase the width of the reduced width hand truck.

It is important to understand that this has been accomplished in the hand truck to be described without the sacrifice of strength and rigidity and while providing the operator with a braking system having a strong braking action which can be readily manually controlled by the hand truck operator.

SUMMARY OF THE INVENTION

Applicant's improved hand truck provides vertically extending side rails of the character utilized in applicant's assignee's U.S. Pat. No. 3,997,182 and utilizes cross braces of the character disclosed in that patent or in applicant's assignee's U.S. Pat. No. 4,563,014. The hand truck further utilizes an axle and wheel mechanism of the character disclosed in the aforementioned patents and a nose plate structure of the character disclosed in these patents or in applicant's assignee's U.S. Pat. No. 4,790,547. In view of this, the many hand trucks previously marketed by applicant's assignee and in use in the field may be retrofitted relatively easily with applicant's cable and disc brake system, and with applicant's improved bracket structure which secures to the inner faces of the side rails rather than to the outer faces, and permits the spaced apart wheels to be moved closer together. While applicant is aware that so-called hand operated rim brake systems are used on the rear wheels of bicycles in another field or art, the present hand truck assembly differs considerably from such bicycles wherein a cable actuated device with a wear resistant sheath is trained around a rim provided on the bicycle rear wheel on the exterior face thereof opposite the inner, chain side of the bicycle.

One of the prime objects of the present invention is to provide a hand truck with a dual wheel braking system which is cooperable between the rim discs secured to the interior sides of the wheels and the brackets, and extends in front to rear alignment with the rear faces of the hand truck frame side rails, without requiring that the hand truck wheels be more widely spaced apart to accommodate it.

Another object of the invention is to provide a hand truck of the type described which provides brackets which fit to the inner sides of conventional frame side rails in a manner to rigidly support the braking system elements and the considerable loads which are placed on the load supporting forwardly extending nose plate of the hand truck.

Still another object of the invention is to provide a hand truck of the character described wherein the brackets which are utilized in place of the brackets disclosed in applicant's previously mentioned patent incorporate integral rail parts providing lengthwise stability, while also providing intermediate bands of increased thickness which transmit the load and support braking system components.

Still another object of the invention is to provide a hand truck of the improved character described which can accommodate various nose plate systems, and which permits the retrofitting of hand trucks which are out in the field to convert them to narrow aisle hand trucks with brake systems.

Another object of the invention is to provide a hand truck with a braking system of the character described wherein the braking elements for both wheels may be activated by depressing a single handle located on a readily accessible, but out of the way position, at the upper end of one of the frame side rails.

Still a further object of the invention is to provide a hand truck of the improved construction mentioned which has relatively few operating parts that can be manufactured and marketed economically.

Still another object of the invention is to provide a hand truck of very durable construction which requires virtually no maintenance, and will easily brake when moving down steep inclines.

Still a further object of the invention is to design a hand truck which is ergonomic in character and will enable the operator to avoid back problems and other medical problems associated with his or her sustained operation of such hand trucks.

Other objects and advantages of the invention will become apparent with reference to the accompanying drawings and the accompanying descriptive matter.

GENERAL DESCRIPTION

Figure 1:
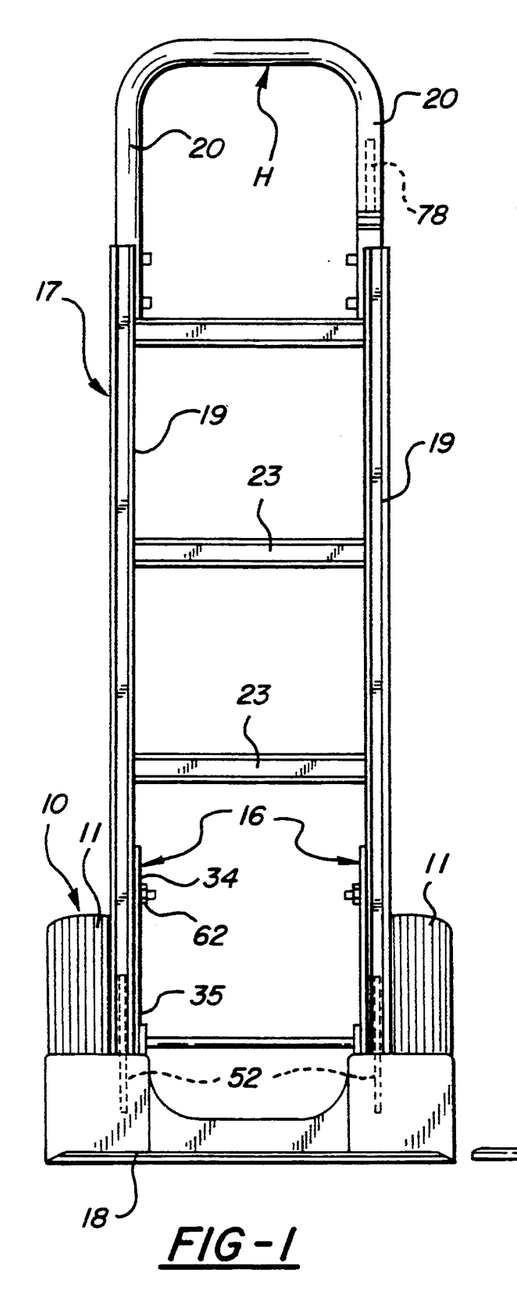
FIG. 1 is a front elevational view of my greatly improved hand truck.
Figure 2:
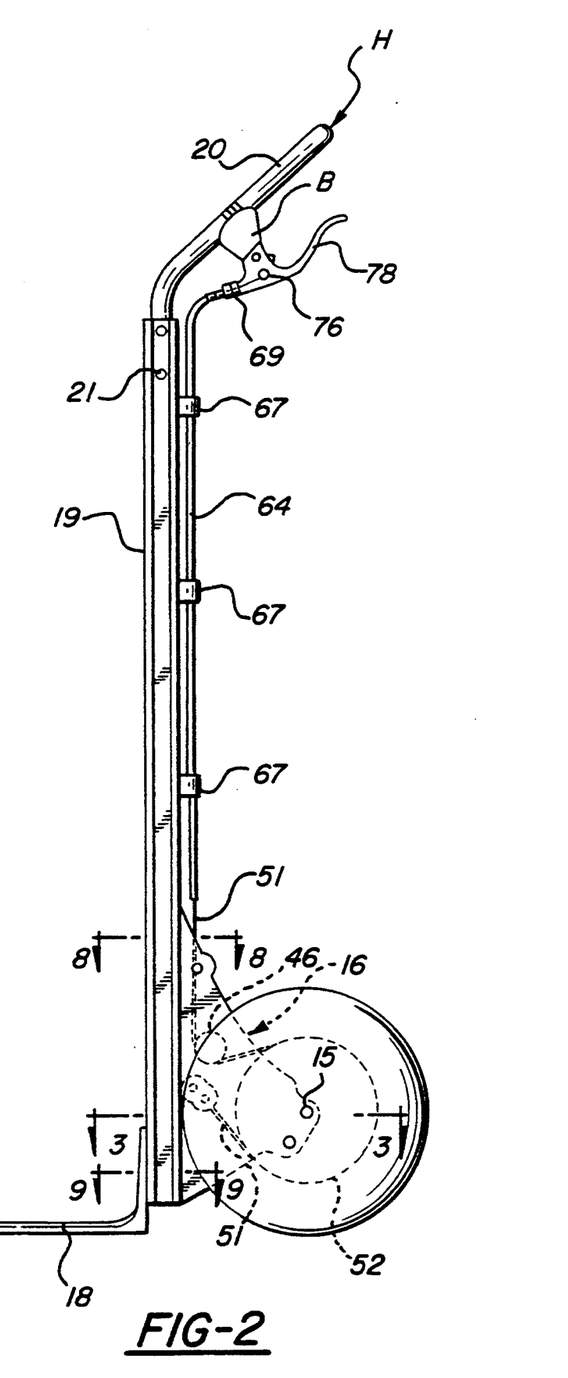
FIG. 2 is an exterior side elevational view thereof.
Figures 3, 7, 17:
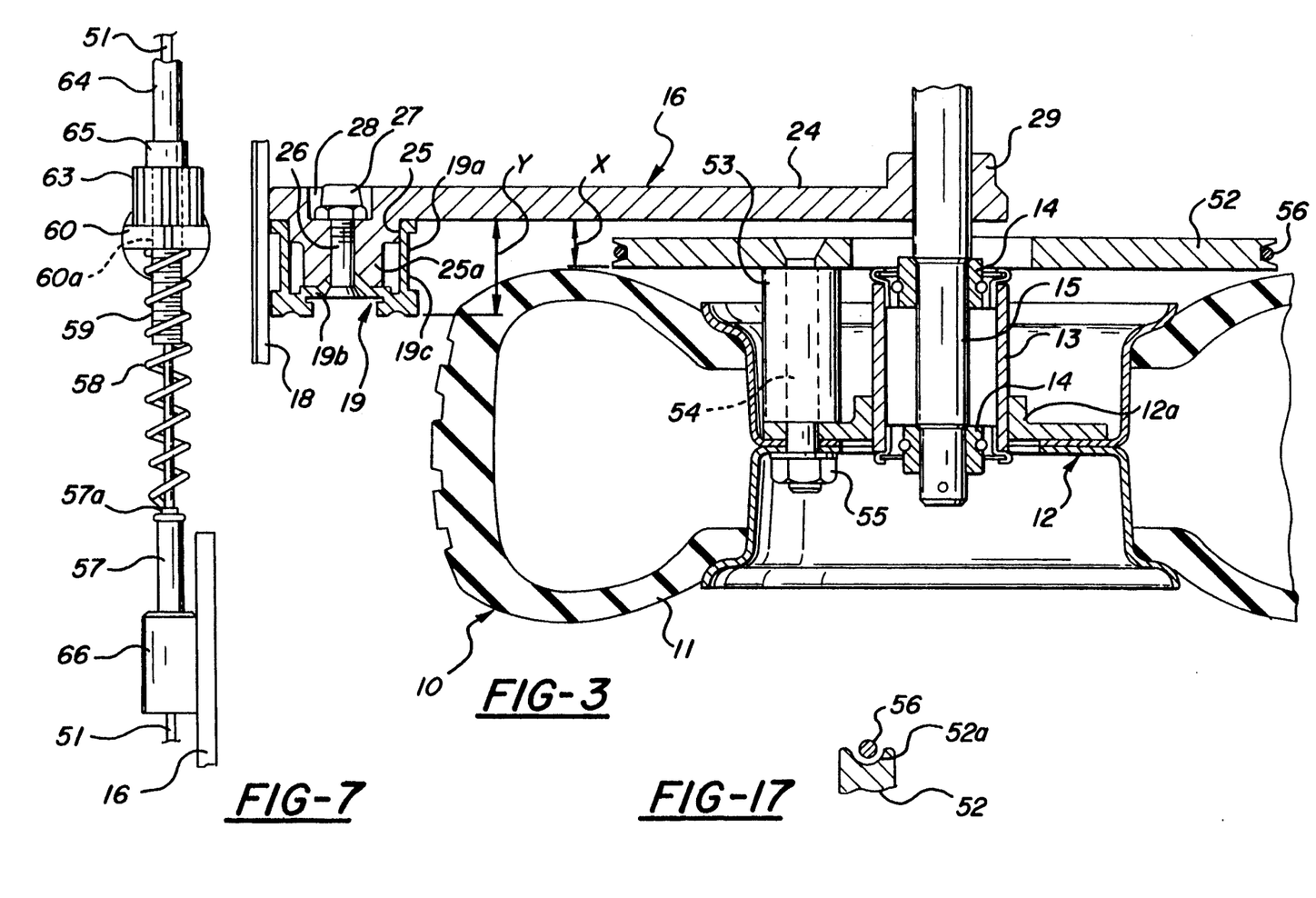
FIG. 3 is a greatly enlarged, fragmentary, top plan view taken on the line 3—3 of FIG. 2.
FIG. 7 is a still further enlarged, fragmentary, elevational view illustrating the spring return mechanism for each of the brake cable systems.
FIG. 17 is a fragmentary, transverse sectional view on an enlarged scale taken on the lines 17—17 of FIG. 6, but with the brake cable in disengaged position.

Referring now more particularly to the accompanying drawings, the hand truck is shown as comprising preferably rubber-tired wheels, generally designated 10, which, as shown in FIG. 3, comprise laterally spaced apart inflatable tires 11, mounted on rims 12 having flanged central hub portions 12a supporting bearing sleeves 13 within which are spaced apart bearings 14, rotatably supporting the wheels for travel on dead axle 15. The axle 15 fixedly supports brackets 16 which will be more particularly described, and which secure to the lower end of a generally rectangular, load carrying, primary or main frame, generally designated 17. A load supporting nose portion 18 is supported on the frame 17 in a manner to be more particularly disclosed, and may be of the type mentioned in any of the aforementioned patents, which I incorporate herein by reference.

The frame 17 is disclosed as having parallel vertical side rails 19, which are inwardly opening, channel-shaped metal extrusions having side walls 19a connected by webs 19b. The side rails 19 at their upper ends receive the legs 20 of a bale-shaped handle member generally designated H which may be secured in position by suitable bolts 21, secured by nuts 22. Also secured between the rail members 19, are the vertically spaced cross braces 23 which are similarly bolted in position in the manner disclosed in the foregoing patents. For purposes of light weight construction, the various parts of the hand truck are preferably formed of aluminum and may comprise extrusions, fabricated parts, castings or die castings. It is to be observed that the brackets 16 do not secure to the laterally outer faces of the extruded rails 19, as previously, but rather bolt to the inner faces thereof. They are thus, not integral parts of the frame rails 19, and rather, are separate components which are specially constructed to perform the multiple functions which will be described.

Figure 4:
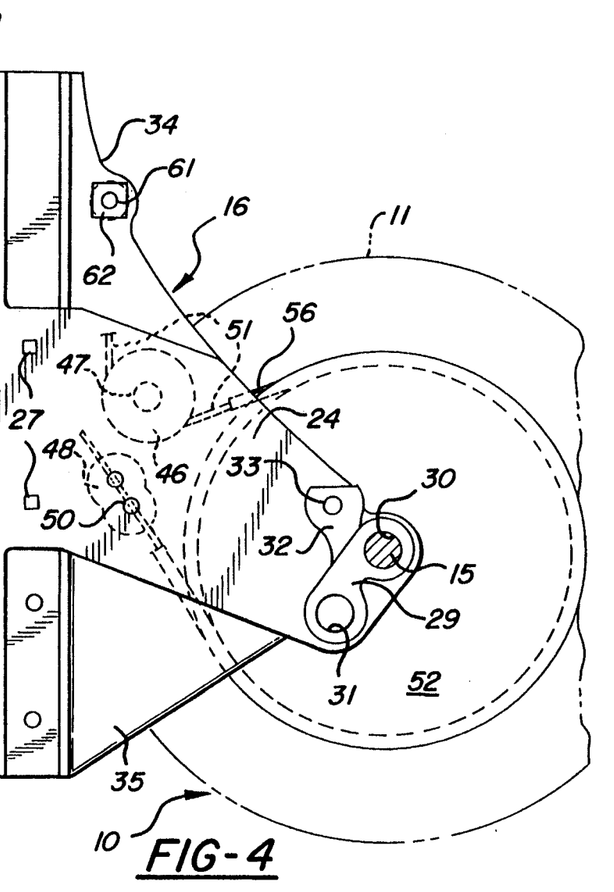
FIG. 4 is a considerably enlarged, exterior fragmentary, side elevational view of the bracket and brake assembly taken on the line 4—4 of FIG. 5.
Figure 5:
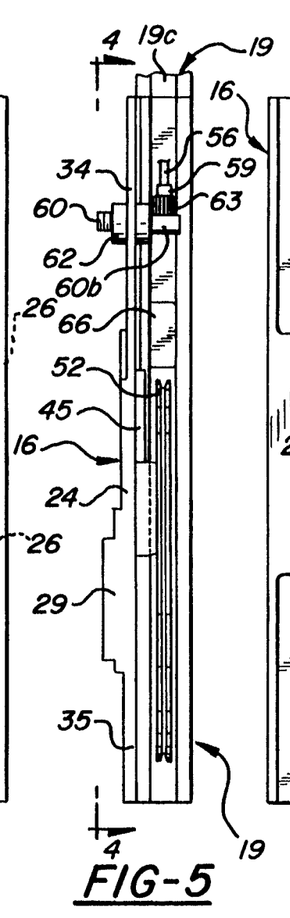
FIG. 5 is a considerably enlarged, fragmentary, end elevational view, with certain parts omitted in the interest of clarity.
Figure 6:
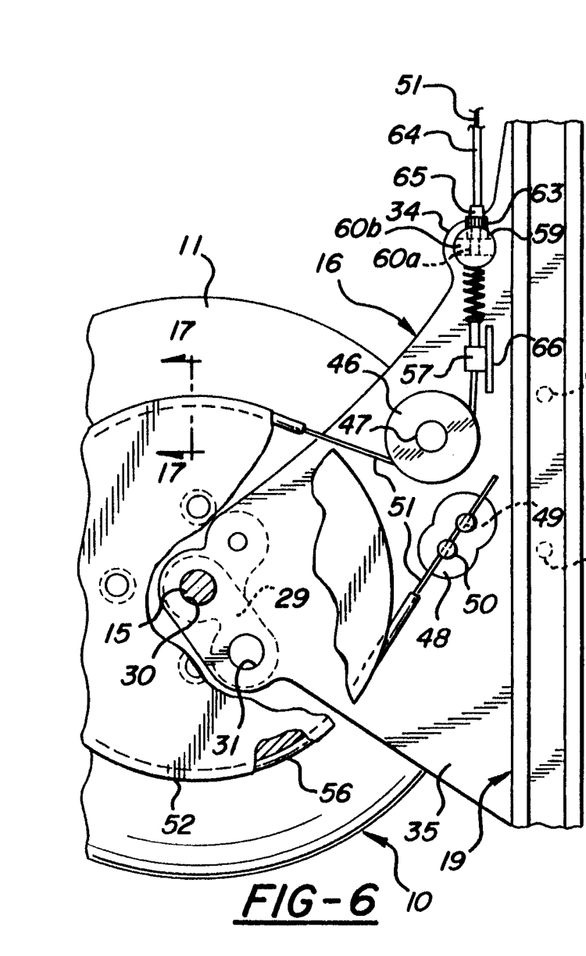
FIG. 6 is a considerably enlarged, fragmentary, elevational view of the interior side of the bracket and brake assembly.

As FIGS. 4 and 6 particularly indicate, each of the brackets 16 includes an integral central or intermediate band portion 24 of the requisite thickness to accomplish load transfer from the hand truck frame 17 to the axle 15 and wheels 10, as well as to provide the rigidity necessary to accommodate certain elements of the wheel brake system which will presently be described. The intermediate band portions 24 have inwardly projecting key sections, generally designated 25, (FIG. 3) which, extend the full height of portions 24, and are received between the side walls 19a of the frame rails 19 and bolted in position, as by bolts 26 secured by nuts 27, received within recesses 28 provided in the intermediate band portions 24 of brackets 16. The reduced portions 25a of snugly fitting keys 25 are thus secured in abutting relation with the webs 19b of rails 19.

Also provided in each bracket band portion 24, is a raised boss portion 29, and it will be noted that openings 30 and 31 are provided in the portions 29 for accommodation of the axle 15, depending on the diameter of the wheels 11 which are utilized. In the present case the axle 15 is received in openings 30 to accommodate the larger size wheels 10 which typically are the ten inch, rather than the eight inch, diameter wheels used when openings 31 are utilized. Also provided on brackets 24, are bosses 32 which have openings 33 for the reception of bolts for attaching stair climbers to the bracket when stair climbers are utilized. Stair climbers are not shown in the drawings, but are shown in some of the aforementioned patents.

Figure 8:
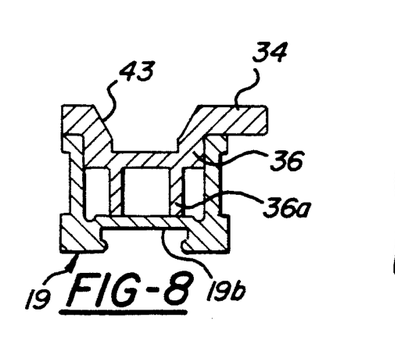
FIG. 8 is a enlarged fragmentary transverse cross sectional view taken on the line 8—8 of FIG. 2.
Figures 9, 15, 16:
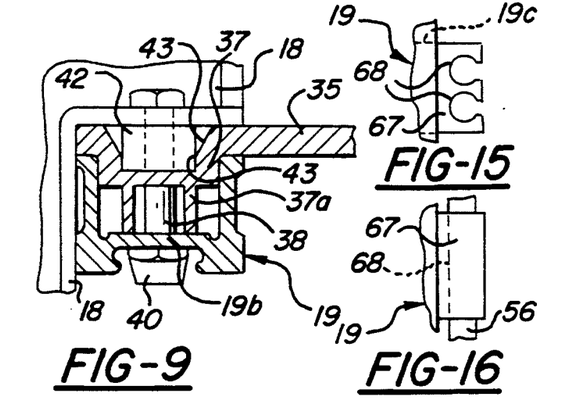
FIG. 9 is a similar view taken on the line 9—9 of FIG. 2.
FIG. 15 is an enlarged fragmentary plan view of one of the cable accommodating clips.
FIG. 16 is a side elevational view thereof.

It will be noted that the intermediate portion 24 of each bracket 16 separates upper and lower web sections 34 and 35 which are of reduced thickness relative to intermediate portions 24, since their function is to stabilize the brackets in a vertical or lengthwise direction and resist rotation due to impact, rather than perform the same functions as the intermediate bracket portions 24. The upper portions 34 have key portions 36 (FIG. 8) which are snugly received in the channel-shaped rails 19, and the lower portions 35 of the brackets have key portions 37 (FIG. 9) which likewise are snugly received within the channel members 19. Each of the sections 36 and 37, further, have reduced size protruding members 36a and 37a respectively which are clamped in abutment with the web portions 19b of side rails 19. Clamping bolts 38, and securing nuts 40, are provided for the lower portions 35 of brackets 16 as shown in FIG. 9.

It is to be understood that the nose plates 18 are provided with key portions 42 (see FIG. 9) which are snugly received within the slotted portions 43 provided in bracket lower portions 35. Because the sections 35 are less in thickness than the sections 24, the retrofitting of existing hand trucks having such noses, with new brackets 16 of the character described, is possible. While typically the brackets 16 may be die cast aluminum parts, it is also contemplated that they may be injection molded parts or compression molded parts, which are formed of a suitably strong synthetic plastic material.

Provided on each of the brackets 16 for a purpose which presently will be described, is a raised boss portion 45, rotatably mounting a pulley 46 on a pin 47. Just below each boss 45 is a figure eight shaped boss 48 with openings 49 for clamp bolt and nut assemblies 50 which fix the ends of brake cables 51 on the bracket portions 24.

As FIGS. 3–6 particularly indicate, sheaves or pulleys 52, of greatly enlarged diameter relative to pulleys 46, are spaced by spacers 53 from the hub 12a of each wheel 10. Bolts 54, secured by nuts 55, fix the pulleys 52 rigidly to the hubs 12a. The cables 51 which extend from the bosses 48 in a clockwise direction in FIG. 6 around pulleys 52 each have a kevlar sheath 56 provided on that portion of each cable 51 which extends around a pulley 52, as shown. The sheaths 56 are adhesively secured to the cables 51 with a suitable epoxy or other adhesive. While kevlar is the presently preferred sheath material, it is thought that other durable, friction applying materials may also function to suitably supply the requisite braking force to pulleys 52 and wheels 10.

It is to be observed that the cables 51 extend around pulleys 46 in the form of loops L contacting the pulleys 52 in the braking position shown in FIG. 6 over about 270 degrees of the surface of the pulley grooves 52a, and each cable 51 has a fitting 57 which is fixed to it and has a reduced portion 57a providing a shoulder functioning as a spring seat for a coil spring 58 through which each cable extends. Threaded posts 59 are further provided in threaded openings 60a provided in the heads 60b of bolt members 60 which extend through openings 61 (FIG. 4) in the brackets 16 and are secured by nut members 62. The posts 59 extend into the upper ends of return springs 58 which bear against the fixed heads of the bolts 60. It is to be understood that springs 58 are normally compressed and exert pressures maintaining the cables 51 and sheaths 56 in slacked position substantially out of engagement with pulleys 52 and the pulley grooves 52a in which they are received. In the slacked position springs 58 maintain the kevlar sheaths 56 in a backed off position, as shown in FIG. 17, in which the slacked loops L are substantially out of engagement with the pulley grooves 52a, but remain within the grooves 52a. Above the heads of bolts 60, adjusting barrels 63 are threaded on the posts 59 to position sheaths 64 for the cables 51 which extend up through members 60 and 64. Each flexible metal sheath 64 has a ferrule 65 securing thereon to abut a barrel 63. It is to be observed that the cylindrical tubular fittings 57 ride vertically on laterally extending longitudinal guide plates 66 provided as an integral part of the brackets 16 just above the pulleys 46. The loops L are maintained in direct-line tangential alignment with pulley grooves 52a in the vertical plane thereof by the pulleys 46 and walls 66.

Figure 14:
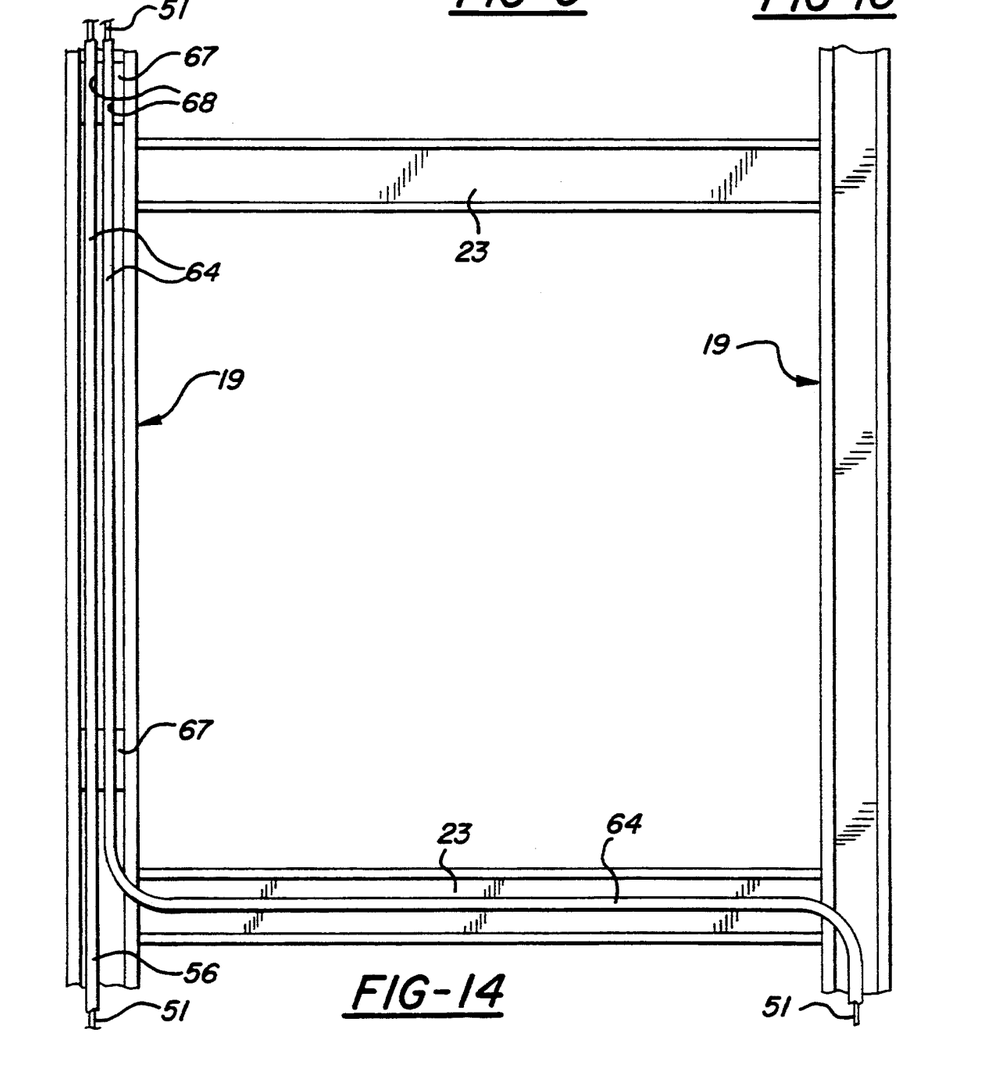
FIG. 14 is an enlarged, fragmentary, rear elevational view of the brake system cables illustrating their manner of application to the hand truck.

Provided on one of the side rails 19 (see FIG. 14) are a series of clips 67 (FIGS. 15 and 16) having longitudinally extending openings 68 for accommodating the sheaths 64 which house cables 51. The clips 67 may be adhesively secured in the recessed slots 19c provided on the rear faces of rails 19. One of the sheath cables 64 is brought across the hand truck frame behind the lowermost brace 23 as shown in FIG. 14 to proceed upwardly in side by side relationship with the sheathed cable 64 for operating the other brake disc 52.

Figure 13:
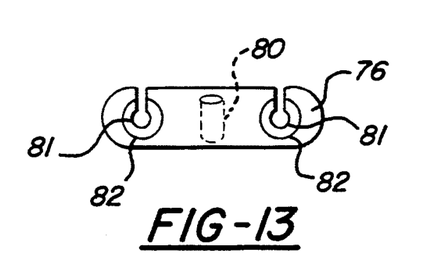
FIG. 13 is a side elevational view of the dual cable connector part only.

The sheathed cables proceed upwardly to a holder member 69. As FIGS. 10 and 11 particularly illustrate, the cable sheaths 64 at their upper ends have ferrules 70 fixed to them which abut adjustable barrels, generally designated 71, which include head portions 72 and threaded stems 73 threaded into threaded openings 74 provided in the holder 69. Lock nuts 75 fix the position of the head portions 72 of the adjusting barrels 71. The purpose of the adjusting barrels 71 is to provide a positioned abutment for the ferrule ends 70 of the sheaths 64 and take out any looseness or slack in the cable sheaths 64. The cables 51 proceed through the ferrules 70, adjusting barrels 71 and passages 69a in the dual holder 69 to connect to a cross pin 76 which extends through an opening 77 (See FIG. 10) provided in a handle member 78. The pin 76 may be secured in fixed position on handle member 78 by a screw fastener 79 or the like. As FIG. 13 illustrates, pin 76 includes a threaded opening 80 for receiving the screw 79 and key slots 81 are each provided with a counterbore 82 for receiving enlargements 51a (see FIG. 11) fixed to the ends of the cables 51 for holding them in position.

Figure 10:
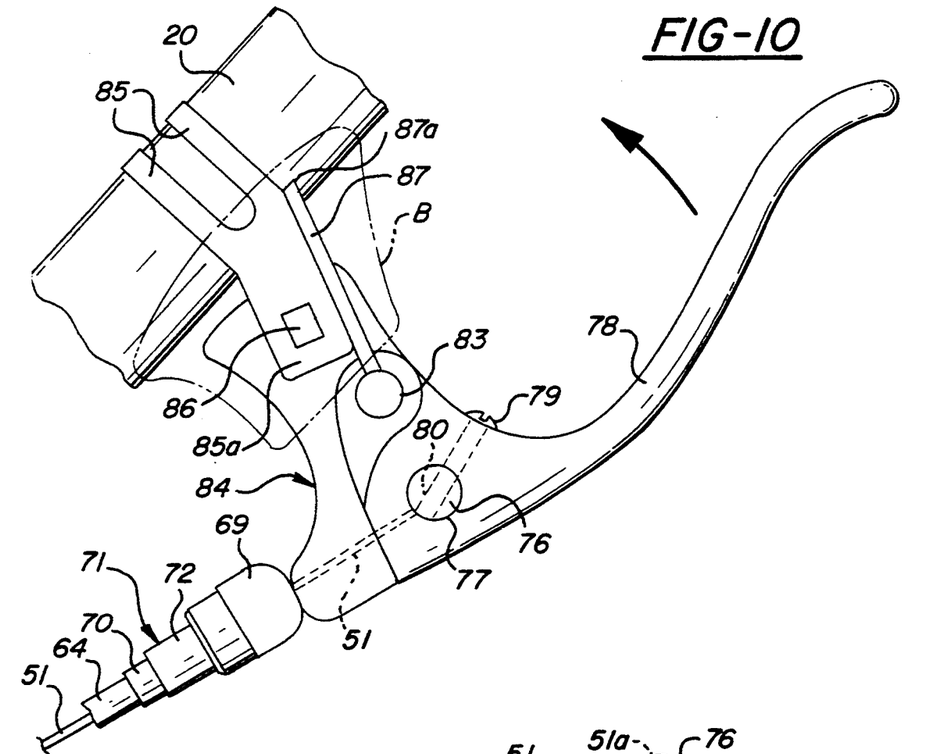
FIG. 10 is an enlarged, fragmentary, side elevational view illustrating the brake actuator mechanism.
Figure 11:
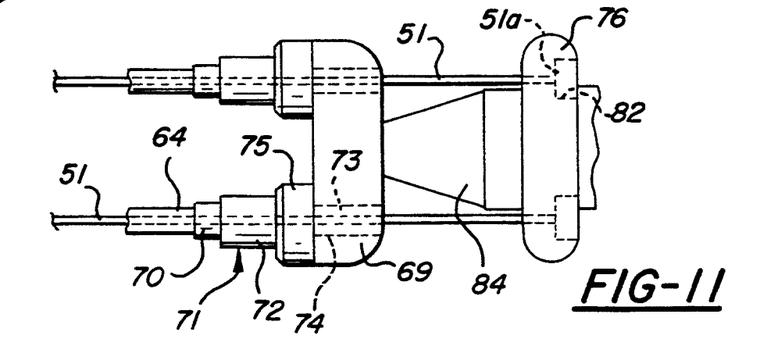
FIG. 11 is an enlarged, fragmentary, end elevational view of the dual cable sheath control assembly utilized at the actuator mechanism.
Figure 12:
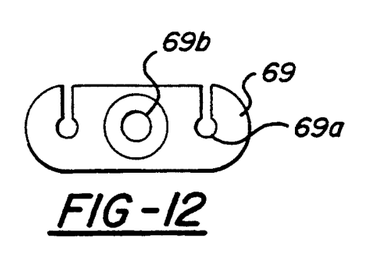
FIG. 12 is a side elevational view of the base part thereof only.

As FIG. 10 particularly indicates, the handle 78 is fixed to a pivot pin 83 which is rotatably received by a handle mount generally designated 84, secured rigidly to one leg 20 of the hand truck handle. The member 69 has a counter bored opening 69b (FIG. 12) for receiving a bolt which threads into an opening in mount 84 to secure it thereto. Mount 84 fixes to a strap portion 85 which secures around the cylindrical leg of the handle and has a portion 85a which bolts as at 86 to mount 84. A plate 87 having a curvilinear opening in its outer end as at 87a functions as a brace shim. The rubber boot generally designated B, shown in chain lines in FIG. 10, can be used to cover portions of the handle support assembly as shown.

THE OPERATION

The cart depicted is one rated for a load capacity of 500 pounds and the main frame, the brackets 16, and the wheel and axle assembly must be capable of handling not only the static loads imposed, but also the impact loads. Typically, the brakes will be applied when the hand truck is moving down a ramp, or down steps, and the braking action must be as reliable as possible to avoid injury to workmen and the damage which can be caused by runaway loads.

In the present instance, the brakes are applied in the energized direction to greatly increase the efficiency of the braking function. This means that the brake cables 51 are pulled upwardly in the same direction as the wheels are rotating when the hand truck is advancing. When it is desired to apply the brakes, it is merely necessary for the operator, whose hands are grasping the handle top rail, to extend a finger over to pivot the brake handle 78 about pivot pin 83 in the direction 3 shown in FIG. 10. This pulls the cables 51 upwardly against the resistance supplied by cable sheaths 64, which tend to resist straightening, and pulls the normally slacked cable sheaths 56 which are adhered to cables 51 tight around pulleys 46, which it will be noted are supported for rotation on the load bearing portions 24 of brackets 16. Pulleys 46 not only provide a cable directional change but, also, in concert with guides 66, maintain the position of the slacked cables 51 in the loops L, when the brake cables 51 are at rest in slacked position. All spring pressure is delivered vertically in the plane of pulley grooves 52a to deliver cable slacking of the loops L downwardly and cause the loops L to remain in the backed off position in which they do not create any appreciable drag when in this neutral or normal position. When the cables 51 are pulled upwardly the ferrules 57 move upwardly with the cables 51 to further compress return springs 58 against the lock bolts 60. The guide plates 66 for the ferrules 57 maintain the braking assemblies in proper alignment during return movement of the cables 51.

When the finger pressure on handle 78 is released, the springs 58 return both cables 51 to original position with the ferrules 57 again guiding on the plates 66. The walls 66 prevent the cables 57 from buckling laterally between springs 58 and direction changing pulleys 46 and, in so doing, leaving the loops L engaging pulleys 52 to create a drag. The sprocket-mounted pulleys 46 and guides 66 thus function as brake cable loop controlling members, as well as slack preventing members during the upward movement of the brake cables 51 and further insure that loads incident to the braking function are borne by and transmitted by the bracket portions 24 to the axle and wheel mechanism. The extreme efficiency of the braking system proposed is demonstrated by the fact that simple finger pressure is effective to virtually instantly brake the wheels 10 of a hand truck carrying a load of the character previously indicated.

It is extremely important that the braking system not laterally increase the width of the hand truck which must be such as to permit the hand truck to move down narrow aisles. In FIG. 3 it is to be noted that the distance x which is the entire lateral space requirement for the complete braking system at each side is less than the dimension y which is the normal lateral width of the hand truck frame rail member 19.

With the system described, eight inch wheels can be substituted for the ten inch wheels and the axles 15 moved to be received in openings 31 without altering the position of any of the brake applying elements or affecting the operability of the braking system.

It is to be understood that the braking discs 52 will provide more comfortable anti-lock braking with reduced grabbing when the discs 52 are made of anodized aluminum with a teflon impregnation, or of a very high molecular weight polyethylene. The cables 51 are preferably readily available 0.060 diameter wound strand standard steel cables. With the brackets 16 mechanically interlocked to the inside faces of the hand truck frame side rails, the overall width of the hand truck can be reduced from the industry standard of 20½ inches to 18 inches. With very little effort and skill, any of the present assignees hand trucks which are in use in the field may be readily modified to incorporate the brake systems. Moreover the amount of weight added to the hand truck to incorporate the brake assembly is minimal.

It is to be understood that the embodiments described are exemplary of various forms of the invention only and that the invention is defined in the appended claims which contemplate various modifications within the spirit and scope of the invention.

What is claimed is:

1. An improved hand truck comprising:
   a. a pair of horizontally spaced, vertically extending, side rails connected laterally to form a hand truck frame and having a handle surface incorporated with the upper portion thereof;
   b. said frame incorporating axle supporting brackets fixed to the lower end of the inner side of each side rail to extend rearwardly therefrom, said side rails comprising channels with channel openings facing respectively laterally inwardly toward one another and said brackets each having integral laterally projecting, vertically extending, elongate rail parts received within and in contact with said side rails; and fastener mechanism for securing said rail parts securely to said side rails;
   c. an axle and wheel mechanism on said brackets for supporting the frame, said axle and wheel mechanism including a pair of outboard laterally spaced wheels;
   d. a nose plate structure fixed at the lower end of said hand truck frame having a forwardly extending load support platform with a load engaging upper surface;
   e. a brake disc having a peripherally disposed braking surface secured to the interior side of each wheel to rotate therewith;
   f. brake actuator mechanism mounted on said frame;
   g. a slacked flexible cable actuator each having one end secured to said frame, trained in a generally closed loop around each said disc adjacent said braking surface, the opposite end of each actuator being connected to said brake actuator mechanism;
   h. said brake actuator mechanism including a movable brake operating mechanism which, when moved to an operating position from neutral position, tightens said cable actuators to tauten said cable actuators on said discs to brake said discs and wheels;
   i. guide mechanism on said frame spaced substantially from said return mechanism and in engagement with said cable actuators to maintain said cable actuators in substantially closed loops adjacent the brake surfaces but substantially out of engagement therewith when the cable actuators are returned to slacked position.

2. The hand truck of claim 1 wherein said fastener mechanism comprises laterally extending bolts.

3. The hand truck of claim 1 in which an intermediate band of increased thickness is integrally provided on each of said brackets between said rail parts to mount said axle and wheel mechanism thereon, and said band has a key portion received within said side rails to enable the transfer of load from said side rails directly to said axle and wheel mechanism via said bands.

4. In an improved hand truck:
   a. a pair of horizontally spaced, vertically extending, side rails having a predetermined lateral width and connected laterally to form a hand truck frame, and further having a handle incorporated with the upper portion thereof;
   b. said frame incorporating axle supporting brackets fixed to the lower end of each side rail to extend rearwardly therefrom;
   c. an axle and wheel mechanism on said brackets for supporting the frame, said axle and wheel mechanism including a pair of laterally spaced wheels having inboard and outboard sides;
   d. a nose plate structure, fixed at the lower end of said hand truck frame, having a forwardly extending load support platform with a load engaging upper surface;
   e. a brake disc having a peripherally disposed groove braking surface secured to the inboard side of each wheel to rotate therewith, each disc being directly behind each side rail in front to rear alignment therewith, and of less lateral width than the side rail;
   f. brake actuator mechanism mounted on the upper end of said frame;
   g. a slacked flexible cable actuator having one end secured to said frame, trained in a substantially closed loop around each disc adjacent said braking surface, the opposite end of each actuator being connected to said brake actuator mechanism;
   h. said brake actuator mechanism including a movable brake operating mechanism which, when moved to an operating position from neutral position, pulls said cable actuators upwardly to tighten said flexible cable actuator loops on said discs and brake said discs and wheels; and
   i. mechanism on said brackets engaging said cable actuators to maintain said loops in taut relation when the cable actuators are pulled upwardly and in said substantially closed slacked loops within said groove braking surfaces but substantially out of drag contact therewith when the cable actuators return to slacked position.

5. The hand truck of claim 4 wherein said brackets fix to the inner sides of said side rails and said discs fix to the interior sides of said wheels, and said one end of each flexible cable actuator is secured to one of said brackets.

6. The hand truck of claim 5 in which said elements include springs, spring stops, guide pulleys, and clamp bolts securing said one end of the cable actuator to said frame.

7. The hand truck of claim 6 in which said side rails and brackets, have a predetermined lateral width and the lateral space required for said guide pulleys and discs outboard of each bracket is less than the lateral width of a side rail.

8. The hand truck of claim 4 wherein said mechanism engaging said cable actuators to maintain said actuators in slacked loops comprises elements fixed to maintain the cable actuators in the plane of said groove braking surfaces.

9. An improved hand truck comprising:
 a) a pair of horizontally spaced, vertically extending, side rail channels connected laterally to form a hand truck frame and having a handle surface incorporated with the upper portion thereof;
 b) said frame incorporating axle-supported front to rear extending brackets having front and back ends fixed to the lower end of each side rail to extend rearwardly therefrom;
 c) an axle and wheel mechanism on said brackets for supporting the frame, said axle and wheel mechanism including a pair of laterally spaced wheels on an axle;
 d) a nose plate structure, fixed at the lower end of said hand truck frame, having a forwardly extending load support platform with a load engaging upper surface;
 e) said side rail channels having laterally inboard, opposed recessed channel openings facing respectively laterally inwardly toward one another, and said brackets each having vertically spaced apart upper and lower web portions with integral laterally outwardly projecting, vertically extending upper and lower key parts received within said inboard recessed channel openings in contact with said side rails to resist twisting stresses, said brackets also having vertically intermediate front to rear extending load transfer web bands, of substantially increased thickness relative to said web portions extending from the back to front ends of said brackets, said intermediate load transfer web bands having bosses at their rear ends projecting laterally inwardly from said load transfer web bands, said load transfer web bands and bosses having openings through which said axle extends in load transfer relationship, the load transfer bands having integral key parts extending laterally from said load transfer bands in vertical alignment with said upper and lower key parts which are received within said laterally inwardly facing channel openings in contact with said side rails to have primary load transfer engagement with said side rail channels and load-isolate said upper and lower web portions; and
 f) releasable fastener mechanism for fastening said upper and lower key parts and said web band key parts securely within said side rail channels.

10. The hand truck of claim 9 wherein said nose plate structure has laterally spaced apart front to rear extending vertical walls engaged with the inboard sides of said lower web portions, and said fastener mechanism mounts said nose plate walls to said bracket lower web portions and thereby to the side rail channels.

11. An improved hand truck comprising:
 a) a pair of horizontally spaced, vertically extending, side rail channels connected laterally to form a hand truck frame and having a handle surface incorporated with the upper portion thereof;
 b) said frame incorporating axle-supported front to rear extending brackets having front and back ends fixed to the lower end of each side rail to extend rearwardly therefrom;
 c) an axle and wheel mechanism on said brackets for supporting the frame, said axle and wheel mechanism including a pair of outboard laterally spaced wheels on an axle;
 d) a nose plate structure, fixed at the lower end of said hand truck frame, having a forwardly extending load support platform with a load engaging upper surface;
 e) said side rail channels having recessed channel-shaped openings, and said brackets each having upper and lower web portions with integral laterally projecting, vertically extending, upper and lower key parts received within said recessed channel openings to resist twisting stresses, said brackets also having vertically intermediate load transfer web bands, of substantially increased thickness relative to said web portions extending from the back to front ends of said brackets with the load transfer web bands being formed with laterally projecting bosses, said load transfer web bands and bosses having openings through which said axle extends in load transfer relationship, the load transfer bands having key parts extending laterally from said load transfer bands and received within said recessed channel openings in contact with said side rail channels to have primary load transfer engagement with said side rail channels; and
 f) releasable fastener mechanism for fastening said upper and lower key parts and said web band key parts securely within said side rail channels.

12. An improved hand truck comprising:
 a) a pair of horizontally spaced, vertically extending, side rail channels connected laterally to form a hand truck frame and having a handle surface incorporated with the upper portion thereof;
 b) said frame incorporating axle-supported front to rear extending brackets having front and back ends fixed to the lower end of each side rail to extend rearwardly therefrom;
 c) an axle and wheel mechanism on said brackets for supporting the frame, said axle and wheel mechanism including a pair of outboard laterally spaced wheels;
 d) a nose plate structure, fixed at the lower end of said hand truck frame, having a forwardly extending load support platform with a load engaging upper surface;
 e) said side rail channels having recessed channel openings, and said brackets each having upper and lower web portions with integral laterally projecting, vertically extending, vertically spaced apart, upper and lower key parts received within said recessed channel openings to resist twisting stresses, said brackets also having vertically intermediate load transfer web bands, of substantially increased thickness relative to said web portions extending from the front to the back ends of said brackets, said intermediate transfer web bands having laterally projecting bosses at their rear ends, said load transfer web bands and bosses having openings through which said axle extends in load transfer relationship, the load transfer bands having integral projecting band key parts extending laterally from said load transfer bands and received within said recessed channel openings in contact with said side rail channels to have principal load transfer engagement with said side rail channels; and f) releasable fastener mechanism for fastening said upper and lower key parts and said web band key parts securely within said side rail channels.

* * * * *